United States Patent [19]

Schmelz

[11] Patent Number: 5,628,186
[45] Date of Patent: May 13, 1997

[54] METHOD AND APPARATUS FOR CONTROLLED INTRODUCTION OF A REDUCING AGENT INTO A NITROGEN OXIDE-CONTAINING EXHAUST GAS

[75] Inventor: Helmut Schmelz, Prien, Germany

[73] Assignee: Siemens Aktiengesellschaft, Munich, Germany

[21] Appl. No.: 551,791

[22] Filed: Nov. 7, 1995

Related U.S. Application Data

[63] Continuation of PCT/DE94/00463, Apr. 27, 1994.

[30] Foreign Application Priority Data

May 7, 1993 [DE] Germany .......................... 43 15 278.3

[51] Int. Cl.$^6$ ......................................................... F01N 3/20
[52] U.S. Cl. ........................... 60/274; 60/286; 60/301
[58] Field of Search ............................. 60/274, 286, 301

[56] References Cited

U.S. PATENT DOCUMENTS

| | | | |
|---|---|---|---|
| 4,403,473 | 9/1983 | Gladden | 60/274 |
| 5,471,836 | 12/1995 | Takeshima | 60/286 |

FOREIGN PATENT DOCUMENTS

| | | |
|---|---|---|
| 3615021 | 11/1987 | Germany . |
| 3721572 | 2/1988 | Germany . |
| 3704030 | 8/1988 | Germany . |
| 4217552 | 8/1993 | Germany . |
| 2132112 | 7/1984 | United Kingdom . |

OTHER PUBLICATIONS

Patent Abstract of Japan No. JP 55-093917 (Hiroaki et al.) Jul. 16, 1980.

Primary Examiner—Douglas Hart
Attorney, Agent, or Firm—Herbert L. Lerner; Laurence A. Greenberg

[57] ABSTRACT

A method for the controlled introduction of a reducing agent into a nitrogen oxide-containing exhaust gas leaving an internal combustion engine through an exhaust line having a catalytic converter built in for reducing nitrogen oxide, includes detecting at least one operation-relevant parameter of the exhaust gas, of the catalytic converter and optionally of the engine to determine the nitrogen oxide rate. An intermediate value is determined for the reducing agent rate as a function of the nitrogen oxide rate. The intermediate value is reduced by a rate of the reducing agent desorbed by the catalytic converter or raised by a rate of the reducing agent adsorbed by the catalytic converter. An apparatus for performing the method includes a control unit. A device detects at least one operation-relevant parameter of the exhaust gas, of the catalytic converter and optionally of the engine. A reducing agent supply unit introduces the reducing agent into the exhaust line upstream of the catalytic converter. The control unit is intended to adjust a rate of the reducing agent introduced into the exhaust gas as a function of the parameters, while taking into account a rate of the reducing agent adsorbed by the catalytic converter or desorbed by the catalytic converter.

28 Claims, 3 Drawing Sheets

METHOD AND APPARATUS FOR CONTROLLED INTRODUCTION OF A REDUCING AGENT INTO A NITROGEN OXIDE-CONTAINING EXHAUST GAS

CROSS-REFERENCE TO RELATED APPLICATION

This application is a Continuation of International Application Ser. No. PCT/DE94/00463, filed Apr. 27, 1994.

BACKGROUND OF THE INVENTION

1. Field of the Invention

The invention relates to a method and an apparatus for the controlled introduction of a reducing agent into a nitrogen oxide-containing exhaust gas from an internal combustion engine, having a catalytic converter built into the exhaust line for reducing nitrogen oxide.

Due to the pollutant content in the exhaust gas, the use of fossil energy-carriers in internal combustion engines in the traction mode presents major problems in areas with high motor vehicle densities, above all in industrial countries. Pollutants that can be mentioned include, among others, nitrogen oxides, hydrocarbons, carbon monoxide, oxides of sulfur, and soot, which contribute to well-known environmental problems, such as acid rain and smog.

As environmental consciousness increases and as legal requirements in terms of pollutant emissions becomes stricter, a number of catalysts and soot filters have been developed that contribute to reducing the emission of the aforementioned pollutants. In order to reduce pollutants in the exhaust gas of Otto engines, catalysts containing noble metal, for instance, are known in which hydrocarbons and carbon monoxide are converted along with nitrogen oxides and residual oxygen to form carbon dioxide, nitrogen and/or water. In order to reduce pollutant emissions from Diesel engines, so-called particle filters are known which trap the soot particles contained in the exhaust gas. The elimination of the soot particles is carried out by burnoff in the particle filter. Work is also being done in many places to develop a regulated Diesel catalyst, with which the intent is for it to be possible to lower the nitrogen oxide content in the exhaust gas of a Diesel engine considerably. Due to the high residual content of oxygen from the air in the exhaust gas, this cannot be done with the known noble-metal-containing catalysts, of the kind used in vehicles with Otto engines and stoichiometric combustion.

Instead, in vehicles with Diesel and lean-mix engines, that is engines with superstoichiometric combustion, so-called deNOx catalysts are used, with which the nitrogen oxides contained in the exhaust gas are converted with a suitable reducing agent, usually ammonia, into environmentally friendly nitrogen and water by the selective catalytic reduction (SCR) process. The reducing agent or a precursor of the reducing agent is introduced into the exhaust gas upstream of the catalyst in terms of the exhaust gas flow direction and then enters the catalyst in a preferably homogeneous mixture with the nitrogen oxides contained in the exhaust gas.

Internal combustion engines are operated in the traction mode with variable load and rpm. Accordingly, the quantities of nitrogen oxide generated by per unit of time and the flow rates and temperatures of the exhaust gas are subject to major fluctuations. There is currently no known solution for adjusting the quantity of reducing agent introduced into the exhaust gas per unit of time in such a way that high precipitation rates for the nitrogen oxides and simultaneously a vanishingly slight escape of reducing agent are attained regardless of the operating state of the engine. A further difficulty is that ammonia is poisonous, and even at a concentration of only about 5 ppm it represents a considerable odor burden to the human being. For that reason, an escape of ammonia must unconditionally be avoided.

Patent Abstracts of Japan Publication No. JP-A 55093917 teaches the detection of the exhaust gas flow rate, the nitrogen oxide concentration in the exhaust gas, and the exhaust gas temperature, along with the temperature of the denitration catalyst. Through the use of those data and in accordance with the nitrogen oxide rate, a rate of introduction into the exhaust gas is performed that takes into account the catalytic activity of the catalyst, which is dependent on the catalyst temperature. It has been found that such a method, especially at positive and negative sudden load changes, does not prevent an escape of reducing agent or nitrogen oxide.

SUMMARY OF THE INVENTION

It is accordingly an object of the invention to provide a method and an apparatus for the controlled introduction of a reducing agent into a nitrogen oxide-containing exhaust gas, which overcome the hereinafore-mentioned disadvantages of the heretofore-known methods and devices of this general type and which meet the aforementioned requirements.

With the foregoing and other objects in view there is provided, in accordance with the invention, in a method for the controlled introduction of a reducing agent into a nitrogen oxide-containing exhaust gas leaving an internal combustion engine through an exhaust line having a catalytic converter built into the exhaust line for reducing nitrogen oxide, the improvement which comprises detecting at least one operation-relevant parameter of the exhaust gas, at least one operation-relevant parameter of the catalytic converter and optionally at least one operation-relevant parameter of the engine, to determine a nitrogen oxide rate $MNO_x$; determining an intermediate value $Z_1(\dot{M}_R)$ for the reducing agent rate $\dot{M}R$ as a function of the nitrogen oxide rate $MNO_x$; and reducing the intermediate value $Z_1(\dot{M}_R)$ by a rate $\dot{M}_D$ of the reducing agent desorbed by the catalytic converter or raising the intermediate value $Z_1(\dot{M}_R)$ by a rate $\dot{M}_A$ of the reducing agent adsorbed by the catalytic converter.

With the objects of the invention in view, there is also provided, in an assembly having an internal combustion engine, an exhaust line conducting a nitrogen oxide-containing exhaust gas from the engine, and a catalytic converter built into the exhaust line for reducing nitrogen oxide, an apparatus for the controlled introduction of a reducing agent into the exhaust gas, comprising a control unit; a device associated with the control unit for detecting at least one operation-relevant parameter of the exhaust gas, at least one operation-relevant parameter of the catalytic converter and optionally at least one operation-relevant parameter of the engine; and a reducing agent supply unit associated with the control unit for introducing the reducing agent into the exhaust line upstream of the catalytic converter, as seen in a flow direction of the exhaust gas; the control unit adjusting a rate $\dot{M}_R$ of the reducing agent introduced into the exhaust gas as a function of the operation-relevant parameters, while taking into account a rate $\dot{M}_A$ of the reducing agent adsorbed by the catalytic converter or a rate $\dot{M}_D$ of the reducing agent desorbed by the catalytic converter.

As a result, the rate of reducing agent $\dot{M}_R$ introduced into the exhaust gas is sufficient for complete catalytic conversion of the nitrogen oxides in all operating states of the engine that are characterized by a continuous or discontinuous evaluation and weighting of the operation-relevant parameters. At the same time, the reducing agent rate $\dot{M}_R$ is also adjusted in such a way that an escape of the reducing agent is avoided. This exact adjustment of the reducing agent rate $\dot{M}_R$ is attained especially by including the operation-relevant parameters of the catalyst. As a result, the reducing agent rate $\dot{M}_R$ required for catalytic conversion of the nitrogen oxides is not exclusively added in metered form in accordance with the nitrogen oxide rate $\dot{M}_{NOx}$ contained in the exhaust gas but rather and in particular at positive sudden load changes of the engine it is partially replaced by the reducing agent rates $\dot{M}_D$ desorbed by the catalyst. This avoids an overdose of reducing agent, and as a result an escape of reducing agent precisely at positive sudden load changes of the engine is entirely avoided. By comparison, the intermediate value can be raised by the adsorbed reducing agent rate $\dot{M}_A$, so that an adequate amount of reducing agent for converting the nitrogen oxides will always be present, and moreover the catalyst is held with the reducing agent at a defined loading state.

In order to determine the quantity of nitrogen oxide furnished by the engine per unit of time, which is referred to below as the nitrogen oxide rate $\dot{M}_{NOx}$, it is advantageous if the air flow rate, the governor rod path corresponding to the position of the fuel injection device, the charge pressure and/or the engine rpm is provided as the operation-relevant parameter of the engine. Detecting these parameters is already generally typically done in modern electronic Diesel control units, so that no additional expense arises therefor in most cases. The flow rate, for instance, can also be determined by computer by measuring the engine rpm, the charge pressure, or the charge air temperature with simultaneous knowledge of the displacement of the engine. As a result it is possible to determine the nitrogen oxide rate $\dot{M}_{NOx}$ through the use of a comparison of the operation-relevant parameters from the known performance graph data of the engine. These performance graph data are preferably stored in the control unit. This procedure is employed especially whenever no sensor, as a device for measuring the nitrogen oxide concentration, is built into the exhaust line.

If a sensor for measuring the nitrogen oxide concentration is present, then it is advantageous if, as the operation-relevant parameter of the exhaust gas, its temperature, its pressure, its mass flow rate and its nitrogen oxide concentration is provided. The nitrogen oxide rate $\dot{M}_{NOx}$ arriving at the catalyst can be determined from the flow rate and the nitrogen oxide concentration of the exhaust gas. If the exhaust gas temperature is simultaneously known, it is then possible, as will be shown later herein, to determine a suitable reducing agent rate $\dot{M}_R$ and meter it into the exhaust gas in accordance with the temperature course of the catalytic activity of the catalyst.

In accordance with another mode of the invention, with reference to the above paragraph, it is moreover advantageous if the operation-relevant parameter of the catalytic converter is provided as its temperature T, its catalytic activity k with a pressure and temperature course, its specific storage capacity $C_R$ for the reducing agent and a pressure and temperature course of this specific storage capacity, and its physical size, such as the weight of the catalytically active mass, geometry and heat transfer. These parameters can advantageously be implantable into the control unit, or in other words loaded into a memory. Through the use of these parameters, it is possible on one hand for the control unit, given a suitable construction, to make an accurate statement as to the instantaneous operating state of the catalyst. On the other hand, it is possible as a result, for instance upon positive load changes of the engine, which especially cause a drastic increase in the exhaust gas temperature, to make an accurate statement about the reducing agent quantity desorbed by the catalyst per unit of time, which is referred to below as the reducing agent rate $\dot{M}_D$. Moreover, upon negative sudden load changes, which cause a lowering of the exhaust gas temperature, it is possible to ascertain the thus additionally available storage capacity of the catalyst for the reducing agent.

An exact determination of the respective desorbed and adsorbed reducing agent rates $\dot{M}_D$ and $\dot{M}_A$ is unconditionally necessary in order to avoid an escape of reducing agent and simultaneously to furnish adequate reducing agent rates $\dot{M}_R$ for complete conversion of the nitrogen oxides. In order to accomplish this, in the determination of the rates $\dot{M}_D$ and $\dot{M}_A$, the fact that the specific storage capacity $C_R$ of the catalyst for the reducing agent drops with increasing exhaust gas temperature and increases with increasing exhaust gas pressure, may be taken into account.

In accordance with a further mode of the invention, while advantageously taking into account the fact that the catalytic activity k for a certain temperature $T(k_{max})$ has attained a maximum and on either side of this the temperature drops off, it is advantageous if the intermediate value is lowered with a decreasing exhaust gas temperature and raised with an increasing exhaust gas temperature, if the exhaust gas temperature at the catalytic converter is lower than a temperature $T(k_{max})$ at which the catalytic converter has maximum catalytic activity $k_{max}$. Correspondingly, the intermediate value is lowered with an increasing exhaust gas temperature and raised with a decreasing exhaust gas temperature, if the exhaust gas temperature at the catalytic converter is higher than a temperature $T(k_{max})$.

In accordance with an added mode of the invention, while taking into account the further fact that the catalytic activity k increases with increasing exhaust gas pressure (absolute pressure) at the catalyst, it is advantageous to raise the intermediate value with increasing pressure loss at the catalyst (corresponding to a rising absolute pressure) and/or to lower it if the pressure loss is dropping.

In accordance with an additional mode of the invention, since high exhaust gas space velocities can arise at high load and high rpm of the engine, it is advantageous if the intermediate value is reduced if a maximum space velocity, for which the catalytic converter is constructed, is exceeded. Through the use of this correction it is assured that the reducing agent being metered into the exhaust gas is stored in the catalyst and/or is consumed in the catalytic reaction with the nitrogen oxides, and is not exported from the catalyst as a consequence of high exhaust gas space velocities. A correction factor can be obtained, if the maximum space velocity is exceeded, from the ratio between the maximum space velocity and the instantaneous space velocity.

In accordance with yet another mode of the invention, in order to also take into account aging and poisoning of the catalyst in metering the reducing agent, it is expedient if the intermediate value is reduced with increasing length of time in operation, or operating time, $t_B$. As a result, an escape of reducing agent in the event of an aging-dictated loss of catalytic activity of the catalyst and/or a loss of storage capacity of the catalyst for the reducing agent is avoided. However, such an escape would otherwise occur if the reducing agent rate $\dot{M}_R$, being measured, for instance, in accordance with the nitrogen oxide rate $\dot{M}_{NOx}$ contained in the exhaust gas, were unchanged.

In accordance with yet a further mode of the invention, in order to even better take temperature-dictated effects of catalyst aging into account in the above-mentioned consideration of the effects of aging and poisoning of the catalyst, it is advantageous if the intermediate value is reduced in accordance with the exhaust gas temperatures, being weighted with the operating time $t_B$, at the catalyst. In this way, the absolute temperatures and temperature gradients to which the catalyst was exposed during operation are taken into account in the determination of the reducing agent rate $\dot{M}_R$.

In accordance with yet an added mode of the invention, the catalytic converter is freed of reducing agent and hydrocarbons prior to starting of the engine. As a result, the entire catalyst is "empty" when the engine starts. Therefore, in adjusting the reducing agent rate $\dot{M}_R$, the control unit can proceed on the basis of an accurately defined initial state with respect to the burden of reducing agent of the catalyst, and this contributes to an increase in accuracy of reducing agent metering.

In accordance with another feature of the invention, the reducing agent supply unit includes an injection valve, being adjustable through the use of the control unit, for an aqueous urea solution. This is a technically simple way of supplying the reducing agent. An aqueous urea solution can be carried easily and without risk in the vehicle, and it hydrolyzes simply into ammonia, carbon dioxide and water in a so-called hydrolysis catalyst.

In accordance with a further feature of the invention, the catalytic converter then preferably includes, in the following order in the direction of flow of the exhaust gas, a hydrolysis catalyst, a deNO$_x$ catalyst and optionally an oxidation catalyst, which is used as an ammonia escape killer and for catalytic conversion of hydrocarbons and carbon monoxide.

An apparatus that operates according to the method of the invention can be constructed in various ways. Therefore, in accordance with an added feature of the invention, the control unit includes a memory for all of the possible operation-relevant parameters, for the determination of the reducing agent rate $\dot{M}_R$ of the exhaust gas, the catalytic converter, and optionally the engine, and the device issues signals that call up a corresponding memory value for the reducing agent rate $\dot{M}_R$, wherein the memory value is present at an output of the control unit for controlling the reducing agent supply unit.

In accordance with an alternative and equally advantageous feature of the invention, the control unit includes a microprocessor subunit, which uses a program to determine the reducing agent rate $\dot{M}_R$ from the operation-relevant parameters of the exhaust gas, of the catalytic converter and optionally of the engine that are detected by the aforementioned device. In this way it is possible for the actual calculation of the reducing agent rate $\dot{M}_R$ to be performed by software in accordance with expert knowledge on which it is based, so that unlike the preceding embodiment with a performance graph comparison, the determination of the reducing agent rate $\dot{M}_R$ can be carried out in this case simply and optionally even through the use of fuzzy logic. The manifold operation-relevant parameters can be weighted relative to one another, and their absolute values can be weighted in accordance with their value for the metering of the reducing agent, especially through the use of fuzzy logic.

Other features which are considered as characteristic for the invention are set forth in the appended claims.

Although the invention is illustrated and described herein as embodied in a method and an apparatus for the controlled introduction of a reducing agent into a nitrogen oxide-containing exhaust gas, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
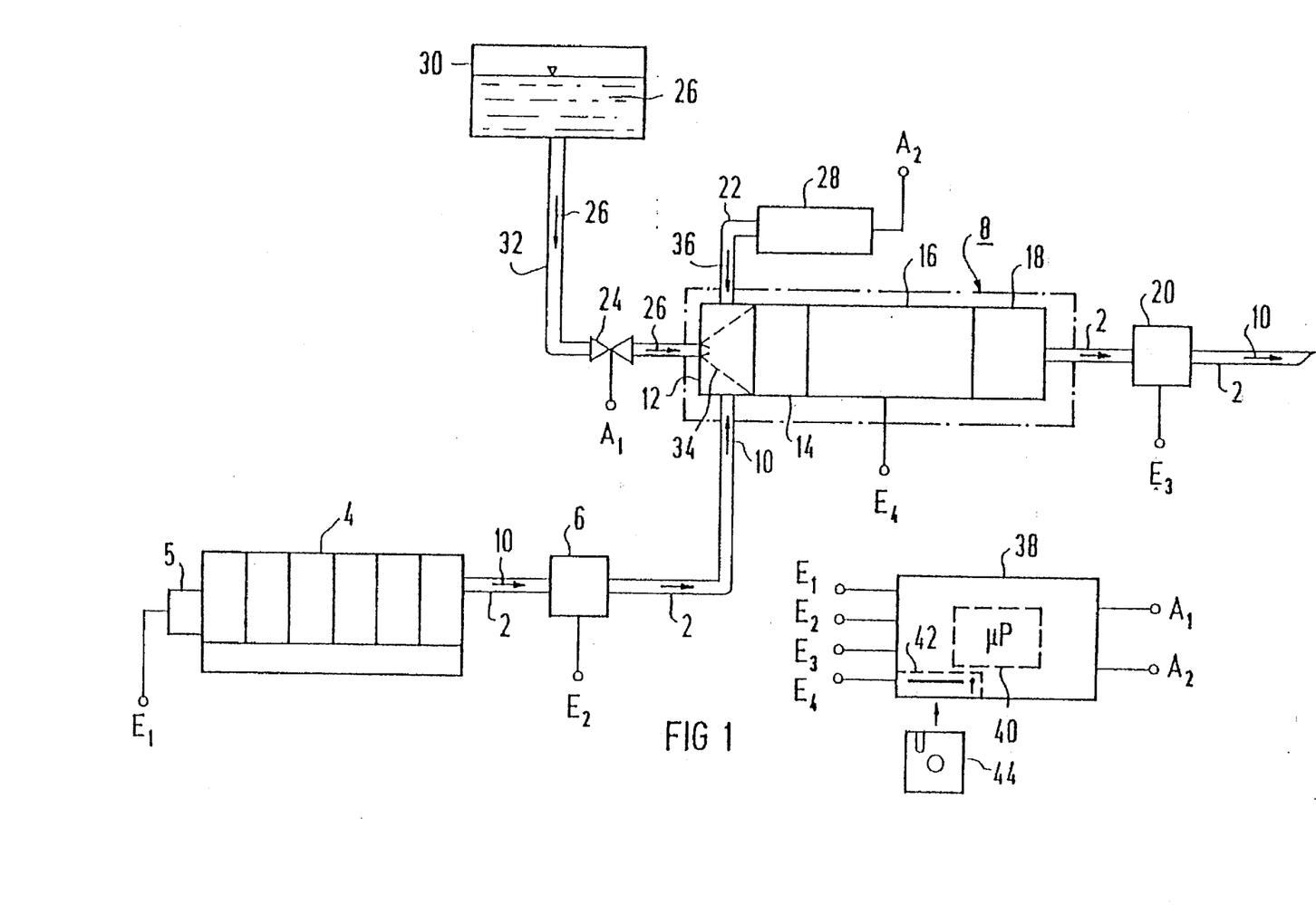
FIG. 1 is a schematic and block circuit diagram of an exhaust line of a 300 kW charge-air-cooled Diesel engine with controlled introduction of a reducing agent into a nitrogen oxide-containing exhaust gas.

Referring now to the figures of the drawing in detail and first, particularly, to FIG. 1 thereof, there is seen an exhaust line 2 of a 300 kW charge-air-cooled Diesel engine 4 with a measurement location 5 connected to the Diesel engine 4. A further measurement location 6, a catalytic converter 8 and an additional measurement location 20, in that order, are installed in the exhaust line 2. As seen in the flow direction of an exhaust gas 10, the catalytic converter 8 includes, in the following order, an inlet chamber 12, a hydrolysis catalyst 14, a deNO$_x$ catalyst 16, and an oxidation catalyst 18. Besides the exhaust line 2, a Bunsen burner exhaust line 22 and a reducing agent supply line 32 are also connected to the inlet chamber 12 of the catalytic converter 8. The supply line 32 has an adjustable injection valve 24 for the controlled addition of a reducing agent 26. Hot exhaust gas 36 of a Bunsen burner 28 is fed as needed through the Bunsen burner exhaust line 22 into the inlet chamber 12. The reducing agent 26, which is an aqueous urea solution in the exemplary embodiment, is kept on hand in a reducing agent tank 30 and is supplied to the injection valve 24 through the reducing agent supply line 32. The reducing agent 26 is injected into the inlet chamber 12 through the use of the injection valve 24, within a zone that is demarcated from the walls of the inlet chamber 12 by perforated plates 34. The exhaust gas 10 and optionally the Bunsen burner exhaust gas 36 enter the inlet chamber 12 outside this zone. The exhaust gases 10, 36 pass through holes in the perforated plates 34 and in the process entrain the reducing agent 26 injected into the inlet chamber 12. This prevents the reducing agent 26 from disadvantageously being deposited on the walls of the inlet chamber 12.

In order to adjust the rate $\dot{M}_R$ of reducing agent injected into the exhaust gas 10 in metered fashion, a control unit 38 with a microprocessor subunit 40 is provided. The control unit 38 has inputs $E_1$ through $E_4$, through which it detects operation-relevant parameters, the knowledge of which is necessary for adjustment of the suitable reducing agent rate $\dot{M}_R$. Through the use of the measurement location 5, which includes a number of sensors, the air flow rate, the governor rod path, which is equivalent to the position of the Diesel injection device, the charge pressure, and the rpm of the Diesel engine 4 are detected. These data are applied to the input $E_1$.

The operation-relevant parameters of the exhaust gas 10 (which are measured, for instance, through the use of the further measurement location 6), in this case its temperature, pressure and flow rate, are applied to the input $E_2$. In the exemplary embodiment, the flow rate and the pressure are calculated from the parameters of the Diesel engine 4 that are supplied to the input $E_1$. It would also be possible for the pressure as well as the flow rate to be measured through separate sensors in the further measurement location 6.

The temperature of the exhaust gas 10, which is measured through the use of the additional measurement location 20 downstream of the catalytic converter 8, is applied to the input $E_3$.

Applied to the input $E_4$ are the operation-relevant parameters of the catalytic converter 8, specifically its catalytic activity and its pressure and temperature course, its specific storage capacity $C_R$ for the reducing agent 26, and the pressure and temperature course of this storage capacity and its physical size, such as the weight of the catalytically active mass, geometry, and heat transfer. These parameters can be stored by way of example on an accompanying diskette 44 as a supplement to the catalytic converter 8. Through the use of a disk drive 42 built into the control unit 38, the parameters can be loaded into the microprocessor subunit 40 (in other words implemented).

The injection valve 24 for the reducing agent 26 is controlled and thus adjusted through an output $A_1$. The adjustment of the rate $\dot{M}_R$ of the reducing agent metered into the exhaust gas 10 through the use of the injection valve 24 is performed as a function of the operation-relevant parameters of the engine 4, the exhaust gas 10 and the catalytic converter 8, as will be described in further detail below. The Bunsen burner 28 can be turned on and off as needed through an output $A_2$.

Figure 5:
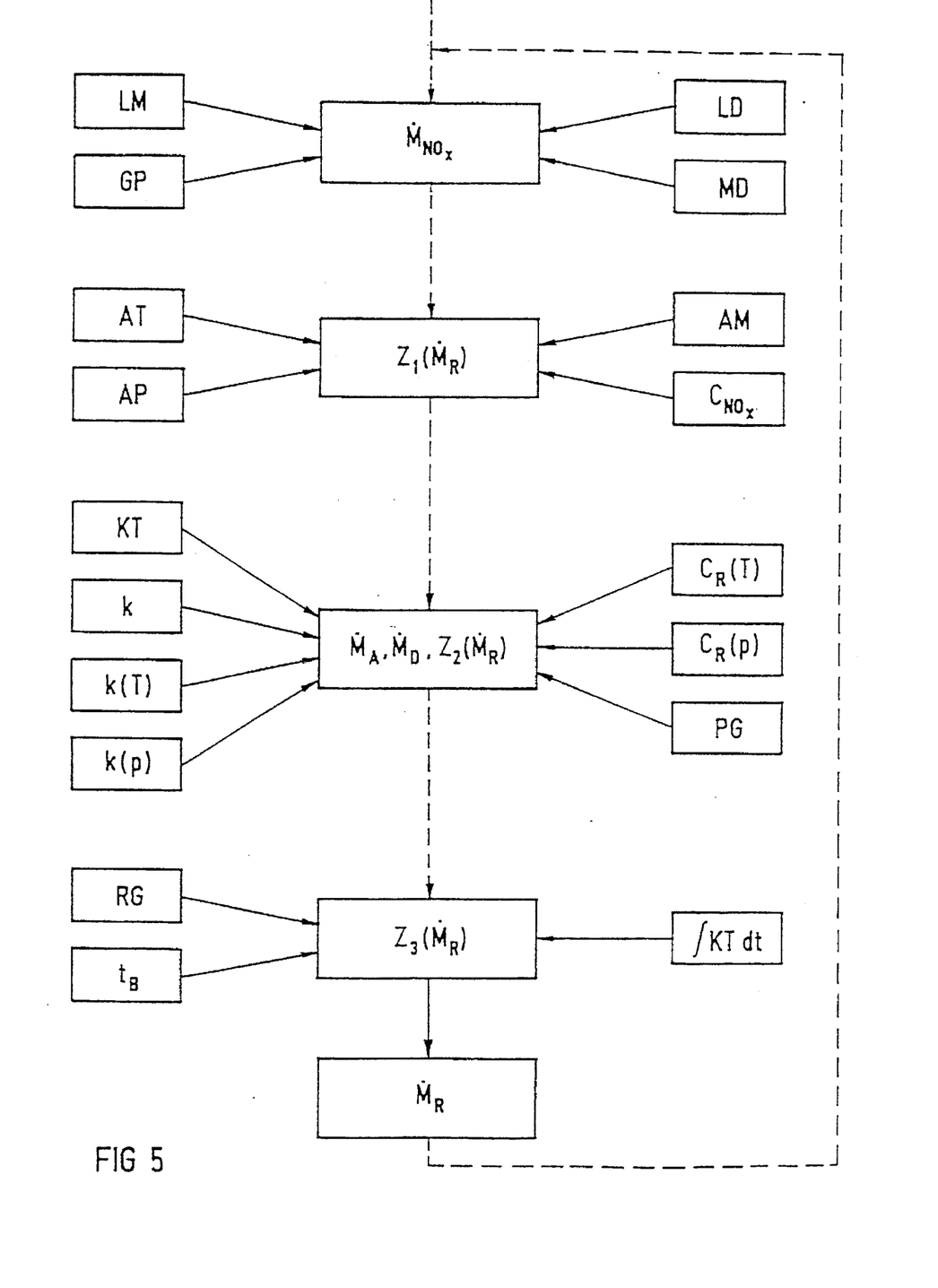
FIG. 5 is a flow chart showing a course of determination of a reducing agent rate $\dot{M}_R$.

A flow chart for determining the reducing agent rate $\dot{M}_R$ is shown in FIG. 5. During operation of the Diesel engine 4, the nitrogen oxide content in the exhaust gas 10 is first determined through the use of the control unit 38, by detection of the parameters measured through the use of the measurement location 5. This determination is made in particular in the microprocessor subunit 40, which through the use of hardware or software, for instance as described in German Published, Non-Prosecuted Patent Application DE-OS 36 15 021, determines a nitrogen oxide rate $\dot{M}_{NOx}$ through the use of a performance graph comparison of the following parameters: air flow rate LM, governor rod path GP, charge pressure LD and engine rpm MD.

A first intermediate value $Z_1(\dot{M}_R)$ for the reducing agent rate $\dot{M}_R$ is determined from operation-relevant parameters of the exhaust gas, such as an exhaust gas temperature AT, exhaust gas pressure AP, exhaust gas flow rate AM and nitrogen oxide concentration $C_{NOx}$, as a function of the value $\dot{M}_{NOx}$ for the nitrogen oxide rate.

Next, a temperature KT of the catalytic converter 8 is determined, especially by computer, on the basis of the measurement of the temperature of the exhaust gas 10 at the measurement locations 6, 20, through the use of the control unit 38, for example by averaging or by integration of the differential equation for the heat transfer of the catalytic converter 8. The catalytic activity is determined by comparison with the respective temperature and pressure course k(T) and k(p) of the catalytic activity k of the catalytic converter 8, which may pertain, for instance, to the temperature in accordance with FIG. 2. In the case of the temperature $T(k_{max})$ and the pressure $p(k_{max})$ at which the catalytic converter 8 has its maximum catalytic activity $k_{max}$, a second intermediate value $Z_2(\dot{M}_R)$ of the reducing agent rate $\dot{M}_R$ is first formed in the control unit 38, which value is only slightly substoichiometric with respect to the nitrogen oxide rate $\dot{M}_{NOx}$ initially contained in the exhaust gas 10. In the case of temperatures that are below or above this temperature $T(k_{max})$, this second intermediate value $Z_2(\dot{M}_R)$ is reduced in accordance with the dropoff in catalytic activity k (see FIG. 2). This adaptation of the second intermediate value has the adaptation to the pressure course of the catalytic activity superimposed upon it. The pressure course rises with increasing absolute pressure at the catalyst.

Figure 3:
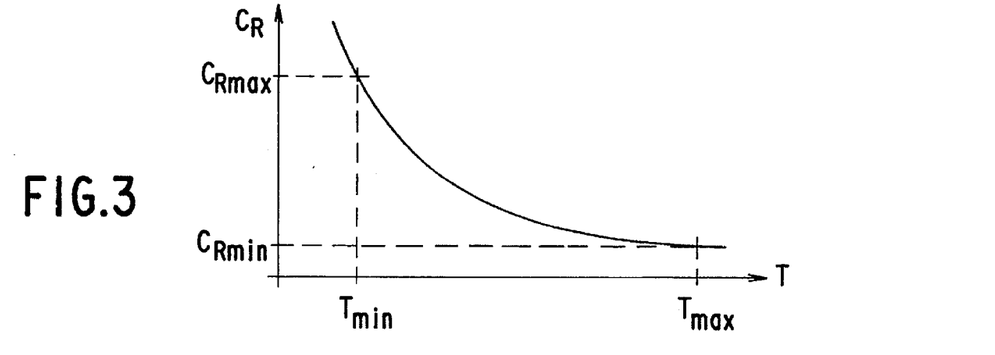
FIG. 3 is a diagram showing a qualitative course of a specific storage capacity $C_R$ of a deNO$_x$ catalyst for a reducing agent as a function of the temperature.

It is possible to determine the desorbant reducing agent rate $\dot{M}_D$ effected by the catalytic converter 8 as a consequence of positive chronological temperature changes through the use of the control unit 38, by taking into account the quantitative relationship between the respective pressure-dependent and temperature-dependent specific storage capacity $C_R(p)$ and $C_R(T)$ for the reducing agent 26 of the catalytic converter 8 as is qualitatively shown, for instance, in FIG. 3 for its possible temperature course $C_R(T)$. The previously formed second intermediate value is reduced by this rate, which then can correspond to the actual net reducing agent rate $\dot{M}_R$ introduced into the catalytic converter 8. Accordingly, in particular when positive sudden load changes of the Diesel engine 4 occur, at which the exhaust gas temperature AT, the nitrogen oxide content $C_{NOx}$ and the flow rate AM of the exhaust gas sometimes rise drastically, the quantity of reducing agent required in the catalytic converter 8 for converting the nitrogen oxides is initially at least partially provided by the reducing agent rate $\dot{M}_D$ desorbed by the catalyst 8, as a result of which first correspondingly less reducing agent 26 is injected into the inlet chamber 12 through the use of the injection valve 24. Analogously, upon negative sudden load changes corresponding to the aforementioned temperature decrease and the reinforced adsorption of reducing agent 26, or in other words in accordance with an adsorbed reducing agent rate $\dot{M}_A$, more reducing agent 26 is supplied than would correspond to the arriving nitrogen oxide rate $\dot{M}_{NOx}$, so as to keep the catalytic converter 8 at a preferred fill level at all times, which generally is other than the maximum fill level.

However, while an increase in the dosage of reducing agent 26 is not made until an actual temperature drop at the catalytic converter 8 occurs in the case of the negative sudden load change, a reduction in the dosage of reducing agent 26 already occurs in the case of a positive sudden load change upon an increase of the governor rod path GP (the gas pedal or accelerator being depressed further) without having to wait for an increase in the temperature T at the catalytic converter 8. The temperature increase to be expected is calculated in advance by the control unit 38 from the operation-relevant data. This effectively prevents the catalytic converter 8 from becoming overloaded with reducing agent 26 in these cases.

The reducing agent 26 being introduced into the inlet chamber through the use of the injection nozzle 24 is carried into the hydrolysis catalyst 14 through the use of the exhaust gas 10. There, the aqueous urea solution used in the exemplary embodiment is hydrolyzed to form ammonia, carbon dioxide and water. The hydrolysis is caused by noble metal components contained in the hydrolysis catalyst 14 and by the elevated temperature prevailing there. The nitrogen oxides are converted, together with the ammonia, into nitrogen and water due to their contact with the catalytically active material of the deNO$_x$ catalyst 16. The hydrocarbons are also already catalytically converted to a large extent at temperatures above 300° C. A catalytic conversion of the hydrocarbons and monoxide still contained in the exhaust gas 10 and a catalytic post-combustion of any slight escape of ammonia that might occur, are attained at the oxidation catalyst 18 that follows the deNO$_x$ catalyst 16.

Figure 4:
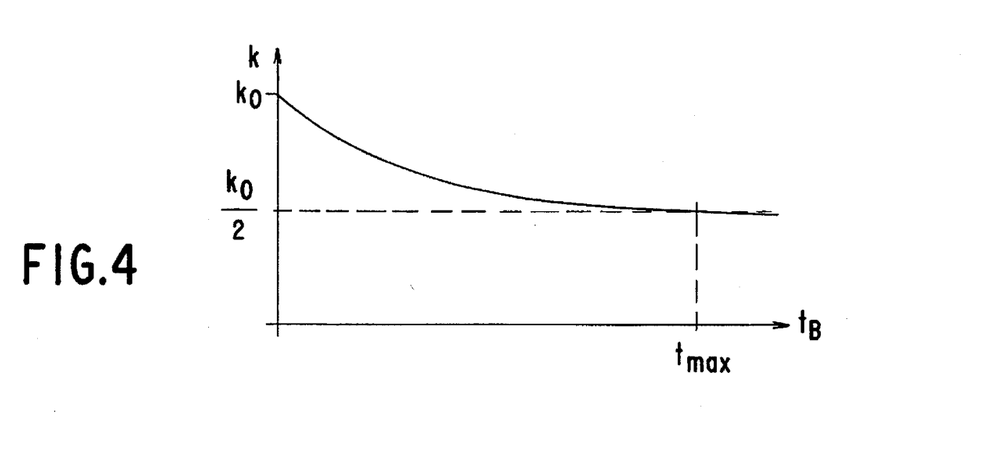
FIG. 4 is a diagram showing a qualitative course of catalytic activity k of a deNO$_x$ catalyst as a function of a total operating time $t_B$.

Optionally, a further step can be carried out for determining the reducing agent rate $\dot{M}_R$. In order to take into account the effects of aging and poisoning at the catalytic converter 8 and in particular at the deNO$_x$ catalyst 16, in the exemplary embodiment a qualitative course, shown in FIG. 4, of the catalytic activity k as a function of a total operating time $t_B$ is implemented and taken into account in the control unit 38, for example by way of the operation-relevant parameters of the catalytic converter 8. As a result, the rate $\dot{M}_R$ of the reducing agent added to the exhaust gas as a function of the nitrogen oxide rate $\dot{M}_{NOx}$ contained in the exhaust gas, or in other words initially the second intermediate value $Z_2(\dot{M}_R)$, is reduced with increasing total operating time $t_B$. This can be carried out in such a way that the driver of the vehicle with the Diesel engine 4 is instructed by the control unit 38 to replace the catalytic converter 8 when a total operating time $t_{max}$ is reached (see FIG. 4), at which the catalytic converter 8 then has only half the initial capacity $k_0$, for instance. In order to even more strongly take into account the thermal load on the catalytic converter 8 with respect to aging that prevails over the operating time, a third intermediate value $Z_3(\dot{M}_R)$ derived from the second intermediate value $Z_2(\dot{M}_R)$ can additionally or alternatively be determined in accordance with the exhaust gas temperatures at the catalytic converter 8 weighted by the operating time $t_B$. This third value is reduced as compared with the second intermediate value $Z_2(\dot{M}_R)$. To that end, the microprocessor subunit 40 can, for instance, calculate the integral over the course over time of the temperature k(T) at the catalytic converter 8.

In the case in which an ammonia sensor is available at the measurement location 20 (or optionally supplemented with non-illustrated measurement locations between catalyst segments), the catalyst parameters can be checked and optionally corrected. If a fixed limit value fails to be attained, an instruction to replace the catalytic converter 8 can also be sent.

A further correction of the formed third intermediate value $Z_3(\dot{M}_R)$ is optionally effected in the exemplary embodiment by taking into account a space velocity RG of the exhaust gas 10 and the catalytic converter 8. The catalytic converter 8 is constructed for a maximum space velocity $RG_{max}$, which is derived from its geometry. If this maximum exhaust gas space velocity is exceeded in the catalytic converter 8, the third intermediate value $Z_3(\dot{M}_R)$ is then reduced, which prevents the reducing agent 26 with the exhaust gas 10 from being virtually "blasted" through the catalytic converter 8 and consequently prevents an undesired escape of ammonia. This reduction can be made, for instance, in accordance with the ratio between the maximum space velocity and the instantaneously prevailing exhaust gas space velocity.

To summarize what has been explained above, because of the respective pressure and temperature course of the catalytic activity k(p) and k(T), the respective pressure-dependent and temperature-dependent specific storage capacity $C_R(p)$ and $C_R(T)$, the exhaust gas space velocity RG, and the effects of aging and poisoning, and with simultaneous knowledge of operation-relevant parameters such as the air flow rate LM, governor rod path RG, charge pressure LD, rpm MD, exhaust gas temperature AT, and exhaust gas flow rate AM, an adjustment according to the invention of the rate $\dot{M}_R$ of the reducing agent metered into the exhaust gas is achieved which brings about the maximum possible precipitation rates for the nitrogen oxides with a negligibly slight escape of ammonia, for every operating state of the Diesel engine 4.

Figure 2:
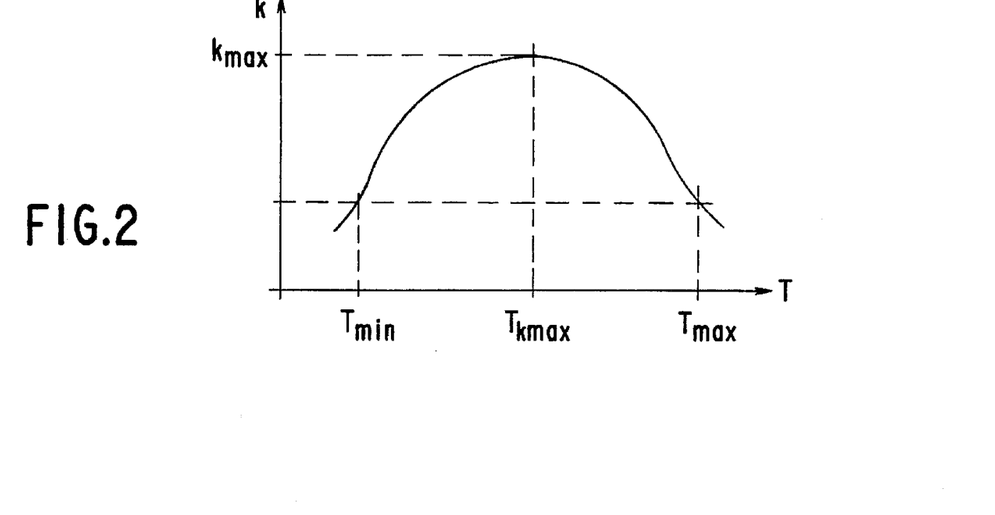
FIG. 2 is a diagram showing a qualitative course of catalytic activity of a deNO$_x$ catalyst as a function of temperature.

In order to further improve this adjustment strategy, it is possible to take into account the fact that the rate $\dot{M}_R$ of the reducing agent being metered into the exhaust gas 10 in accordance with the nitrogen oxide rate $\dot{M}_{NOx}$ contained in the exhaust gas, is set to zero for safety if the temperature AT of the exhaust gas is below a temperature $T_{min}$ as in FIG. 2 or above a temperature $T_{max}$ as in FIG. 2. The temperature at which $T_{min}$ and $T_{max}$ are located depends on the pressure and temperature course of the catalytic activity k of whichever catalytic converter 8 is used. In the case of the deNO$_x$ catalyst 16 chosen in the exemplary embodiment, having a catalytically active substance which includes titanium oxide $TiO_2$ and one or more of the additives $V_xMO_yO_{32-z}$ in which x, y$\geq$1; x+y<12 and z$\leq$1, tungsten oxide $WO_3$, molybdenum oxide $MO_3$ and vanadium oxide $V_2O_5$, the temperature $T_{min}$ is at approximately 240° C. and the temperature $T_{max}$ is at approximately 550° C. With this temperature window, an escape of ammonia and undesired reactions of the ammonia with sulfur oxides contained in the exhaust gas, as well as the formation of undesired nitrogen oxide compounds, such as laughing gas $N_2O$, are especially successfully avoided.

Admittedly, as a consequence, at temperatures below $T_{min}$ and temperatures above $T_{max}$ of the exhaust gas 10, no or only very slight conversion of the nitrogen oxides contained in the exhaust gas 10 takes place by the selective catalytic reduction process. In the case where the temperature is below $T_{min}$, this deficiency is not so grave, since at load states of the Diesel engine 4 at which the exhaust gas temperature is below $T_{min}$, only very slight quantities of nitrogen oxide are produced. In order to destroy at least a portion of the nitrogen oxides contained in such an exhaust gas, the exhaust gas 10 can be recirculated into the intake air of the Diesel engine 4 after at least partially passing through a charge turbine of a non-illustrated turbocharger.

In the case where a temperature T of the exhaust gas 10 is above the temperature $T_{max}$, a device for cooling the exhaust gas can be turned on. Such a device cause the temperature of the exhaust gas 10 to drop below the temperature $T_{max}$ again. This can be accomplished, for instance, by introducing the exhaust gas into a non-illustrated cooling segment, such as an air/air heat exchanger, or by turning on outside-air vent cooling for a portion of the exhaust line 2 and/or injecting water into the exhaust gas 10.

In order to be able to begin the desorption rate $\dot{M}_D$ at a defined initial value, it is advantageous if the catalytic converter 8 is free of reducing agents 26 and hydrocarbons before the Diesel engine 4 is started. At the same time this increases the margin of safety, which can be utilized when the reducing agent 26 is metered in order to avoid an escape of reducing agent. This "emptying" of the catalytic converter 8 can be carried out, for instance, through the use of a brief idling mode with the Bunsen burner 28 switched on following the operating period where the catalytic converter is in use, and/or by turning on the Bunsen burner 28 before the Diesel engine 4 is started.

The method which is carried out in accordance with FIG. 5 for determining the reducing agent rate $\dot{M}_R$ can be performed multiple times per second through the use of known control units, such as hybrid computers.

If the measurement location 6 is equipped with a sensor for measuring the nitrogen oxide concentration and the volumetric flow of the exhaust gas 10, then the resultant construction is simpler than in FIG. 1. Since the oncoming nitrogen oxide rate $\dot{M}_{NO_x}$ at the catalytic converter 8 is now determined directly from the volumetric flow and from the nitrogen oxide concentration of the exhaust gas 10, all that is then necessary is to ascertain the air flow rate of the Diesel engine 4 through the input $E_1$. However, the method described in conjunction with FIG. 1 and the apparatus shown in FIG. 1 for metering the reducing agent 26 into the nitrogen oxide-containing exhaust gas 10 of the Diesel engine 4, remain otherwise unchanged.

It becomes virtually trivially easy to adjust the reducing agent rate $\dot{M}_R$ if the measurement locations 6 and 20 include sensors for measuring the nitrogen oxide, and the respective nitrogen oxide and reducing agent concentrations. The reducing agent rate $\dot{M}_R$ can then be adjusted on the basis of the nitrogen oxide concentration in the exhaust gas 10, and through the use of the nitrogen oxide concentration and reducing agent concentration in the exhaust gas 10 being measured with the measurement location 20 downstream of the catalyst 8, it can be readjusted, for instance in the millisecond range, through the use of the control unit 38.

I claim:

1. In a method for the controlled introduction of a reducing agent into a nitrogen oxide-containing exhaust gas leaving an internal combustion engine through an exhaust line having a catalytic converter built into the exhaust line for reducing nitrogen oxide, the improvement which comprises:
   detecting at least one operation-relevant parameter of the exhaust gas and at least one operation-relevant parameter of the catalytic converter, to determine a nitrogen oxide rate;
   determining an intermediate value for a reducing agent rate as a function of the nitrogen oxide rate; and
   if reducing agent is desorbed by the catalytic converter, reducing the intermediate value by a rate of the reducing agent desorbed by the catalytic converter and, if reducing agent is adsorbed by the catalytic converter, raising the intermediate value by a rate of the reducing agent adsorbed by the catalytic converter.

2. The method according to claim 1, which comprises additionally detecting at least one operation-relevant parameter of the engine to determine the nitrogen oxide rate.

3. The method according to claim 1, which comprises considering the fact that a specific storage capacity for the reducing agent drops with increasing exhaust gas temperature and increases with increasing exhaust gas pressure, upon a determination of the desorbed reducing agent rate and the adsorbed reducing agent rate.

4. The method according to claim 1, which comprises carrying out the reduction upon a chronological change in a governor rod path being caused by a positive load change, corresponding to an advance calculation of a temperature at the catalytic converter.

5. The method according to claim 1, which comprises carrying out the increase only after a temperature drop actually occurs at the catalytic converter.

6. The method according to claim 1, which comprises lowering the intermediate value with a decreasing exhaust gas temperature and raising the intermediate value with an increasing exhaust gas temperature, if an exhaust gas temperature at the catalytic converter is lower than a temperature at which the catalytic converter has a maximum catalytic activity.

7. The method according to claim 1, which comprises lowering the intermediate value with an increasing exhaust gas temperature and raising the intermediate value with a decreasing exhaust gas temperature, if the exhaust gas temperature at the catalytic converter is higher than a temperature at which the catalytic converter has a maximum catalytic activity.

8. The method according to claim 1, which comprises reducing the intermediate value upon exceeding a maximum space velocity for which the catalytic converter is constructed.

9. The method according to claim 1, which comprises reducing the intermediate value with an increasing operating time.

10. The method according to claim 9, which comprises reducing the intermediate value in accordance with exhaust gas temperatures being taken at the catalytic converter and being weighted with the operating time.

11. The method according to claim 1, which comprises freeing the catalytic converter of the reducing agent and of hydrocarbons by burning with a Bunsen burner prior to starting of the engine.

12. The method according to claim 2, which comprises selecting at least one parameter from the group consisting of an air flow rate, a governor rod path corresponding to a position of a fuel injection device, a charge pressure and an engine rpm, as the operation-relevant parameter of the engine.

13. The method according to claim 1, which comprises selecting at least one parameter from the group consisting of exhaust gas temperature, exhaust gas pressure, exhaust gas mass flow rate and exhaust gas nitrogen oxide concentration, as the operation-relevant parameter of the exhaust gas.

14. The method according to claim 1, which comprises selecting all of the parameters from the group consisting of exhaust gas temperature, exhaust gas pressure, exhaust gas mass flow rate and exhaust gas nitrogen oxide concentration, together as the operation-relevant parameter of the exhaust gas.

15. The method according to claim 1, which comprises selecting at least one parameter from the group consisting of temperature of the catalytic converter, catalytic activity of the catalytic converter with a pressure and temperature course, specific storage capacity of the catalytic converter for the reducing agent with the pressure and temperature course, and physical size of the catalytic converter, as the operation-relevant parameter of the catalytic converter.

16. The method according to claim 1, which comprises selecting all of the parameters from the group consisting of temperature of the catalytic converter, catalytic activity of the catalytic converter with a pressure and temperature course, specific storage capacity of the catalytic converter for the reducing agent with the pressure and temperature course, and physical size of the catalytic converter, together as the operation-relevant parameter of the catalytic converter.

17. The method according to claim 15, which comprises selecting the physical size of the catalytic converter as at least one parameter from the group consisting of weight of a catalytically active mass, geometry and heat transfer.

18. The method according to claim 16, which comprises selecting the physical size of the catalytic converter as at least one parameter from the group consisting of weight of a catalytically active mass, geometry and heat transfer.

19. In an assembly having an internal combustion engine, an exhaust line conducting a nitrogen oxide-containing exhaust gas from the engine, and a catalytic converter built into the exhaust line for reducing nitrogen oxide, an apparatus for the controlled introduction of a reducing agent into the exhaust gas, comprising:

control unit;

a device associated with said control unit for detecting at least one operation-relevant parameter of the exhaust gas and at least one operation-relevant parameter of the catalytic converter; and a reducing agent supply unit associated with said control unit for introducing the reducing agent into the exhaust line upstream of the catalytic converter, as seen in a flow direction of the exhaust gas;

said control unit adjusting a rate of the reducing agent introduced into the exhaust gas as a function of the operation-relevant parameters, while taking into account a rate of the reducing agent adsorbed by the catalytic converter and a rate of the reducing agent desorbed by the catalytic converter.

20. The apparatus according to claim 19, wherein said device also detects at least one operation-relevant parameter of the engine.

21. The apparatus according to claim 19, wherein the catalytic converter includes a hydrolysis catalyst and a deNO$_x$ catalyst, as seen in the flow direction of the exhaust gas.

22. The apparatus according to claim 19, wherein the catalytic converter includes a hydrolysis catalyst, a deNO$_x$ catalyst and an oxidation catalyst, as seen in the flow direction of the exhaust gas.

23. The apparatus according to claim 19, wherein said reducing agent supply unit includes an injection valve for the reducing agent being adjustable by said control unit.

24. The apparatus according to claim 19, wherein said reducing agent supply unit includes an injection valve for the reducing agent in the form of an aqueous urea solution, said injection valve being adjustable by said control unit.

25. The apparatus according to claim 19, wherein said control unit includes an output and a memory for at least one operation-relevant parameter for determining a reducing agent rate, for the at least one operation-relevant parameter of the exhaust gas, and for the at least one operation-relevant parameter of the catalytic converter; said parameter detecting device issues signals for calling up a corresponding memory value for the reducing agent rate; and the memory value is present at said output of said control unit for controlling said reducing agent supply unit.

26. The apparatus according to claim 20, wherein said control unit includes an output and a memory for at least one operation-relevant parameter for determining a reducing agent rate, for the at least one operation-relevant parameter of the exhaust gas, for the at least one operation-relevant parameter of the catalytic converter, and for the at least one operation-relevant parameter of the engine; said parameter detecting device issues signals for calling up a corresponding memory value for the reducing agent rate; and the memory value is present at said output of said control unit for controlling said reducing agent supply unit.

27. The apparatus according to claim 19, wherein said control unit includes a microprocessor subunit operating according to a program for determining a reducing agent rate from the at least one operation-relevant parameters of the exhaust gas and of the catalytic converter, being detected by said parameter detecting device.

28. The apparatus according to claim 20, wherein said control unit includes a microprocessor subunit operating according to a program for determining a reducing agent rate from the at least one operation-relevant parameters of the exhaust gas, of the catalytic converter and of the engine, being detected by said parameter detecting device.

* * * * *